United States Patent
Velur et al.

(10) Patent No.: US 12,483,583 B2
(45) Date of Patent: Nov. 25, 2025

(54) AUTOMATED COMPLIANCE-RELATED PROCESSING OF CLOUD NATIVE APPLICATIONS

(71) Applicant: Dell Products L.P., Round Rock, TX (US)

(72) Inventors: Sujeev Velur, Hopkinton, MA (US); Manoharan Erurnthavadi, Bangalore (IN); Julie Ann Dougherty, Natick, MA (US); Narendran Narasimhan, Bangalore (IN); Rajanikanth Markala, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 17/580,040

(22) Filed: Jan. 20, 2022

(65) Prior Publication Data
US 2023/0231865 A1    Jul. 20, 2023

(51) Int. Cl.
*H04L 9/40*     (2022.01)
*G06F 8/65*     (2018.01)

(52) U.S. Cl.
CPC ............ *H04L 63/1433* (2013.01); *G06F 8/65* (2013.01)

(58) Field of Classification Search
CPC ............................... H04L 63/1433; G06F 8/65
See application file for complete search history.

(56) References Cited

U.S. PATENT DOCUMENTS

| 10,235,527 | B1 * | 3/2019 | Dalessio | G06F 16/2379 |
| 10,764,357 | B1 * | 9/2020 | Bonczkowski | H04L 43/10 |
| 11,115,417 | B2 | 9/2021 | Khait et al. | |
| 11,757,907 | B1 * | 9/2023 | Berger | G06N 7/01 726/23 |
| 2010/0037206 | A1 * | 2/2010 | Larimore | G06F 16/188 718/1 |
| 2012/0166442 | A1 * | 6/2012 | Furuichi | G06F 16/353 707/E17.089 |
| 2019/0102162 | A1 * | 4/2019 | Pitre | H04L 63/10 |
| 2019/0180034 | A1 | 6/2019 | Hinton et al. | |
| 2020/0358842 | A1 | 11/2020 | Wuest et al. | |
| 2021/0081561 | A1 | 3/2021 | Blandin et al. | |
| 2022/0391495 | A1 * | 12/2022 | Boshev | G06F 21/577 |

* cited by examiner

*Primary Examiner* — Luu T Pham
*Assistant Examiner* — Paul J Skwierawski
(74) *Attorney, Agent, or Firm* — Ryan, Mason & Lewis, LLP

(57) ABSTRACT

Methods, apparatus, and processor-readable storage media for automated compliance processing for cloud applications are provided herein. An example computer-implemented method includes detecting multiple cloud applications deployed across one or more data center-based cloud platforms comprising multiple geographic locations; identifying, for each of at least a portion of the multiple detected cloud applications, a set of executable programs carrying out runtime support on the cloud application; processing information pertaining to one or more forms of compliance for each of the at least a portion of the multiple detected cloud applications by comparing each identified set of executable programs with one or more pre-approved sets of executable programs; and performing one or more automated actions based at least in part on results of the comparing of each identified set of executable programs with one or more pre-approved sets of executable programs.

17 Claims, 6 Drawing Sheets

AUTOMATED COMPLIANCE-RELATED PROCESSING OF CLOUD NATIVE APPLICATIONS

FIELD

The field relates generally to information processing systems, and more particularly to techniques for providing security in such systems.

BACKGROUND

In a cloud native environment, as large numbers of applications are deployed, compliance often becomes increasingly challenging. However, conventional cloud-related data security systems fail to dynamically determine and maintain status records of all deployed applications and compliance parameters thereof. With such deficiencies, cloud platforms can be vulnerable to varied security threats across distributed environments.

SUMMARY

Illustrative embodiments of the disclosure provide techniques for automated compliance processing for cloud applications. An exemplary computer-implemented method includes detecting multiple cloud applications deployed across one or more data center-based cloud platforms comprising multiple geographic locations, and identifying, for each of at least a portion of the multiple detected cloud applications, a set of executable programs carrying out runtime support on the cloud application. The method also includes processing information pertaining to one or more forms of compliance for each of the at least a portion of the multiple detected cloud applications by comparing each identified set of executable programs with one or more pre-approved sets of executable programs. Additionally, the method includes performing one or more automated actions based at least in part on results of the comparing of each identified set of executable programs with one or more pre-approved sets of executable programs.

Illustrative embodiments can provide significant advantages relative to conventional cloud-related data security systems. For example, problems associated with security vulnerabilities are overcome in one or more embodiments through automatically processing compliance parameters associated with deployed cloud applications across geographically distributed cloud platforms.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
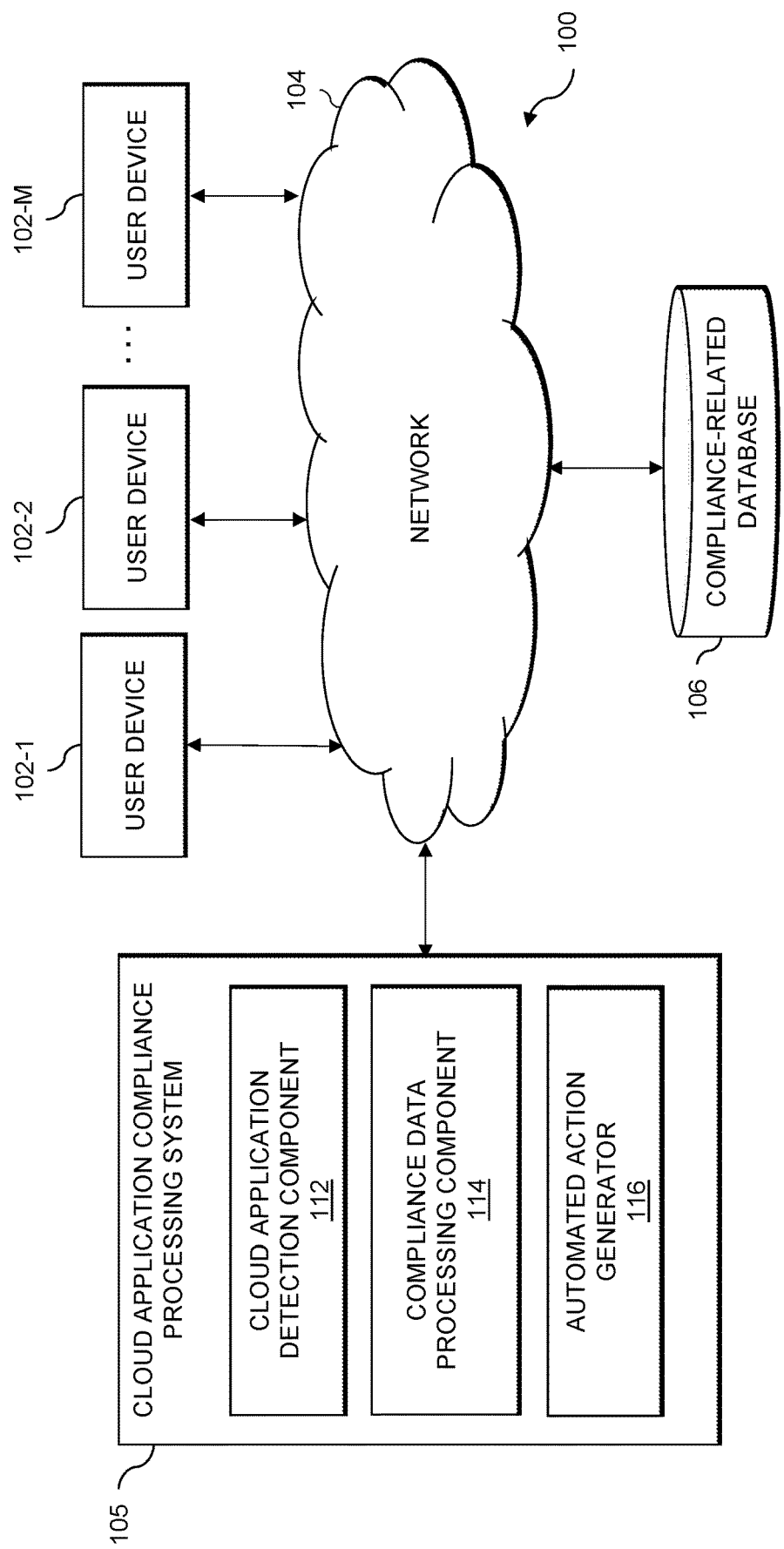
FIG. 1 shows an information processing system configured for automated compliance processing for cloud applications in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is cloud application compliance processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." Additionally or alternatively, user devices 102 may comprise processing devices associated with one or more data center-based cloud platforms.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, cloud application compliance processing system 105 can have an associated compliance-related database 106 configured to store data pertaining to compliance information, which comprise, for example, buildpack information, application information, etc.

The compliance-related database 106 in the present embodiment is implemented using one or more storage systems associated with cloud application compliance processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with cloud application compliance processing system 105 are one or more input-output devices, which illustratively comprise keyboards, displays or other types of input-output devices in any combination. Such input-output devices can be used, for example, to support one or more user interfaces to cloud application compliance processing system 105, as well as to support communication between cloud application compliance processing system 105 and other related systems and devices not explicitly shown.

Additionally, cloud application compliance processing system 105 in the FIG. 1 embodiment is assumed to be implemented using at least one processing device. Each such processing device generally comprises at least one processor and an associated memory, and implements one or more functional modules for controlling certain features of cloud application compliance processing system 105.

More particularly, cloud application compliance processing system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows cloud application compliance processing system 105 to communicate over the network 104 with the user devices 102, and illustratively comprises one or more conventional transceivers.

The cloud application compliance processing system 105 further comprises a cloud application detection component 112, a compliance data processing component 114, and an automated action generator 116.

It is to be appreciated that this particular arrangement of elements 112, 114 and 116 illustrated in the cloud application compliance processing system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automated compliance processing for cloud applications involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, cloud application compliance processing system 105 and compliance-related database 106 can be on and/or part of the same processing platform.

An exemplary process utilizing elements 112, 114 and 116 of an example cloud application compliance processing system 105 in computer network 100 will be described in more detail with reference to the flow diagram of FIG. 4.

Accordingly, at least one embodiment includes automated compliance processing for cloud applications. As noted above and further detailed herein, in a cloud native application environment, as code is deployed and run in a dynamic way, it becomes a challenge to monitor and oversee application security postures of large numbers of microservices and/or other cloud applications. Accordingly, at least one embodiment includes scanning all deployed microservices within at least one cloud platform, identifying at least one compiled buildpack, comparing the at least one compiled buildpack with a set of pre-approved buildpacks, and determining the compliance status for each of the deployed microservices based at least in part on the comparison. In cloud platforms, buildpacks provide framework and runtime support for applications. Buildpacks can perform functions such as examining applications and determining what dependencies to download, as well as determining how to configure the applications to communicate with one or more bound services. In accordance with one or more embodiments and/or use cases, to ensure buildpacks stay up-to-date with security vulnerabilities, bug fixes, and/or new features, providers release the buildpacks and/or updated versions of the buildpacks on a periodic basis (e.g., every month). To protect microservices and/or cloud applications from any potential vulnerability, it is preferred that the latest buildpack and/or latest version of a buildpack be used.

Additionally, at least one embodiment includes generating and outputting one or more visualizations pertaining to the determined compliance status information of one or more microservices and/or other cloud applications within at least one cloud platform (e.g., all of the microservices and/or other cloud applications within a given cloud platform).

Additionally or alternatively, one or more embodiments can include integrating with one or more separate systems within a given cloud platform (e.g., a human resources (HR)

system, a security system, etc.) and providing a visual tool (to the integrated system(s)) to showcase compliance information (e.g., the compliance percentage of applications under each leader in a given organization), which can facilitate security-related decision-making within the platform. By way merely of illustration, in an example multi-cloud platform environment, there can be thousands of microservices hosted as part of a software development life cycle. It can be challenging to notify each application owner and request the owners to move to a latest buildpack. Hence, in such an embodiment and/or use case, each microservice can be associated with at least one HR system which provides a clear hierarchical view and/or visibility to the leader of a team and/or group associated with the given application.

One or more embodiments can be implemented in connection with a cloud native environment which uses a shared platform across many applications. In a conventional setting, security threats can arise in one or more of the deployed applications with existing compiled code which may need attention and/or remedial action. New buildpacks with security patches are typically released periodically on a given temporal schedule (e.g., every 6-8 weeks) which may not align with the actual security threats, and updating and/or maintaining such buildpacks outside of the given temporal schedule would require dynamic visibility of all of the running application version levels and security postures of the running applications within the system and/or platform.

Accordingly, one or more embodiments includes generating and/or implementing a virtualized cloud application analyzer which integrates cloud application metadata (e.g., application technologies, buildpack information, stack information, tracking tool and/or management platform information, route and multi-datacenter deployment information used to assess the compliance status of a given microservice, etc.) with one or more separate systems (e.g., security systems, human resources systems) and provides such systems with compliance visibility for all of the microservices and/or other cloud applications associated with a given subsystem and/or system leader. By way merely of example, such provided visibility can enable and/or facilitate a given leader to take one or more remedial actions in connection with a cloud application experiencing a security threat, dynamically protecting other resources and/or portions of the system or platform.

More specifically, at least one embodiment includes implementing an intelligent compliance analyzer tool for cloud native applications which detects each deployed microservice and/or other cloud application across one or more datacenter-based cloud platforms in one or more geographic locations, compares one or more compliance parameters (e.g., if a microservice is flagged as non-compliant if using a buildpack which is not in a compliance buildpack list, if a mission critical application has to be deployed in a minimum number of data centers for high availability, if a microservice is not in compliance with a process, etc.) of each detected microservice and/or cloud application with a set of one or more pre-approved packages (e.g., application runtime information, including related dependencies and up-to-date security fixes), persists the results of such comparisons in at least one database and generates one or more reports (e.g., one or more visualizations) pertaining to at least a portion of the compliance status information. Accordingly, instead of scanning each individual end-point for vulnerabilities (which can be resource-intensive), one or more embodiments include identifying the buildpack being used by each given cloud application and flagging the buildpack and/or corresponding cloud application for compliance reporting.

Additionally, in at least one embodiment, each detected microservice is tagged and/or identified as being associated with one or more given sub-systems and/or departments, for example, using a human resources system database to maintain organizational hierarchy. Such an embodiment can include providing a visual tool to showcase the various compliance percentage of applications under each leader in the organization, which can aid in driving security-related decisions.

Based at least in part on the determined compliance status information, one or more embodiments can include performing one or more automated actions. For example, such an embodiment can include ensuring that a given cloud application, determined to be implementing an out-of-date buildpack, be updated to be running using the latest available buildpack and stack(s) to prevent potential security vulnerability. In carrying out such an embodiment, a compare mechanism can be implemented in connection with existing buildpacks which are running in the environment and ideal state(s) of given cloud applications. As noted herein, such cloud applications can sometimes span multiple datacenters and multiple geographic regions. Accordingly, one or more embodiments include detecting and/or identifying all geographically-distributed cloud native applications within a system and/or platform and linking the visibility of each application and compliance status thereof to a corresponding system and/or organization leaders.

Figure 2:
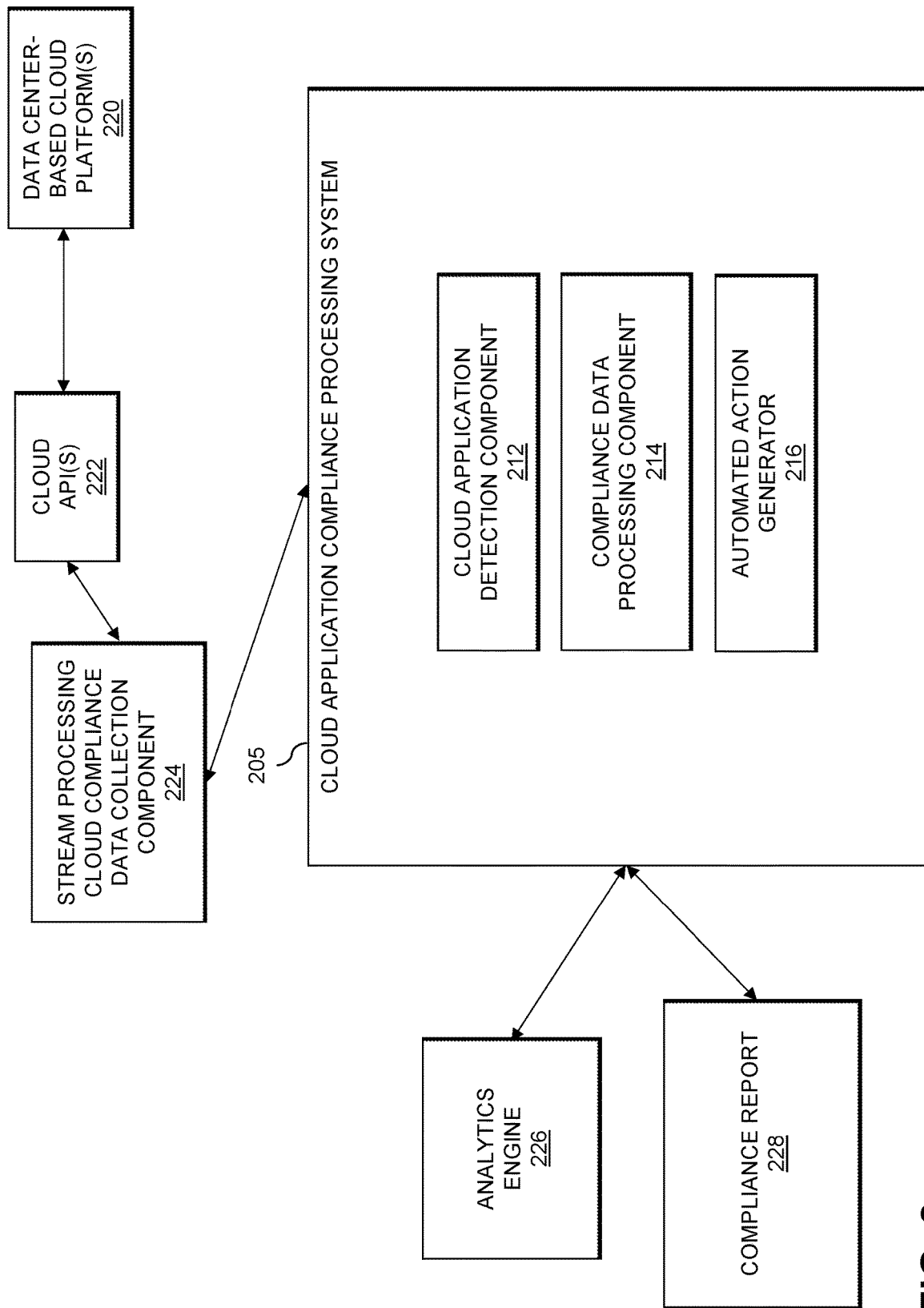
FIG. 2 shows an example workflow for automated compliance processing of cloud applications in an illustrative embodiment.

FIG. 2 shows an example workflow for automated compliance processing of cloud applications in an illustrative embodiment. By way of illustration, FIG. 2 depicts one or more data center-based cloud platforms 220, which utilize one or more cloud application programming interfaces (APIs) 222 and interact with stream processing cloud compliance data collection component 224. In at least one embodiment, stream processing cloud compliance data collection component 224 connects each data center-based cloud platform 220 and collects the required metadata of each microservice thereof. Once the necessary metadata are collected, necessary compliance rules are applied to at least a portion of the metadata, which can then be stored into compliance database (e.g., compliance-related database 106 in the FIG. 1 embodiment). Additionally, stream processing cloud compliance data collection component 224 provides at least a portion of the data collected via cloud API(s) 222 to cloud application compliance processing system 205, which, similar to FIG. 1, includes cloud application detection component 212, compliance data processing component 214, and automated action generator 216. Further, in the example embodiment depicted in FIG. 2, cloud application compliance processing system 205 (e.g., via automated action generator 216) outputs compliance-related data to an analytics engine 226 for further processing and/or outputs at least one compliance report 228. In at least one embodiment, once data collection is completed, the analytics engine 226 validates at least a portion of such data against one or more rules (e.g., in connection with at least one buildpack used by the given microservice, whether the given microservice is deployed in the datacenter for high availability or not, etc.).

In at least one embodiment, an intelligent compliance analyzer (also referred to herein as cloud application compliance processing system) collects and/or obtains metadata pertaining to all deployed microservices and/or other cloud applications across one or more cloud platforms from various geographic regions, scans and analyzes the microservices and/or other cloud applications (e.g., analyzes information pertaining to one or more compliance parameters), identifies the compliance buildpack for each microservice and/or other cloud application, compares the identified buildpack with a set of pre-approved buildpacks, and persists information derived from the comparisons in a database and generates an output and/or other report (e.g., one or more visualizations) pertaining to the compliance status of each microservice and/or other cloud application.

By way merely of illustration, consider an example use case wherein a Java buildpack includes Java virtual machines, modules, libraries, and caching needed for Java code execution. At least one example embodiment can include analyzing the buildpack of one or more application containers using a relevant buildpack dictionary (e.g., a set of rules pertaining to compliant and non-compliant buildpack information), and flagging the application as compliant or non-compliant. For instance, assume that the application is using Java buildpack version 8.12, which has an identified security issue, while a new version (e.g., Java buildpack 9.10) is available with a fix for the identified security issue. An example embodiment in such an instance would include determining the non-compliance of the application with respect to its current buildpack, and identifying and/or automatically implementing the new version of the buildpack to remedy and/or avoid the related security issue.

As also noted herein, such an embodiment can also include integrating (i.e., integrating the compliance analyzer) with one or more human resources systems and providing a visual tool to showcase the compliance percentage of cloud applications under one or more leaders in the corresponding organization (which can, for example, aid decision-making by such leaders).

Figure 3:
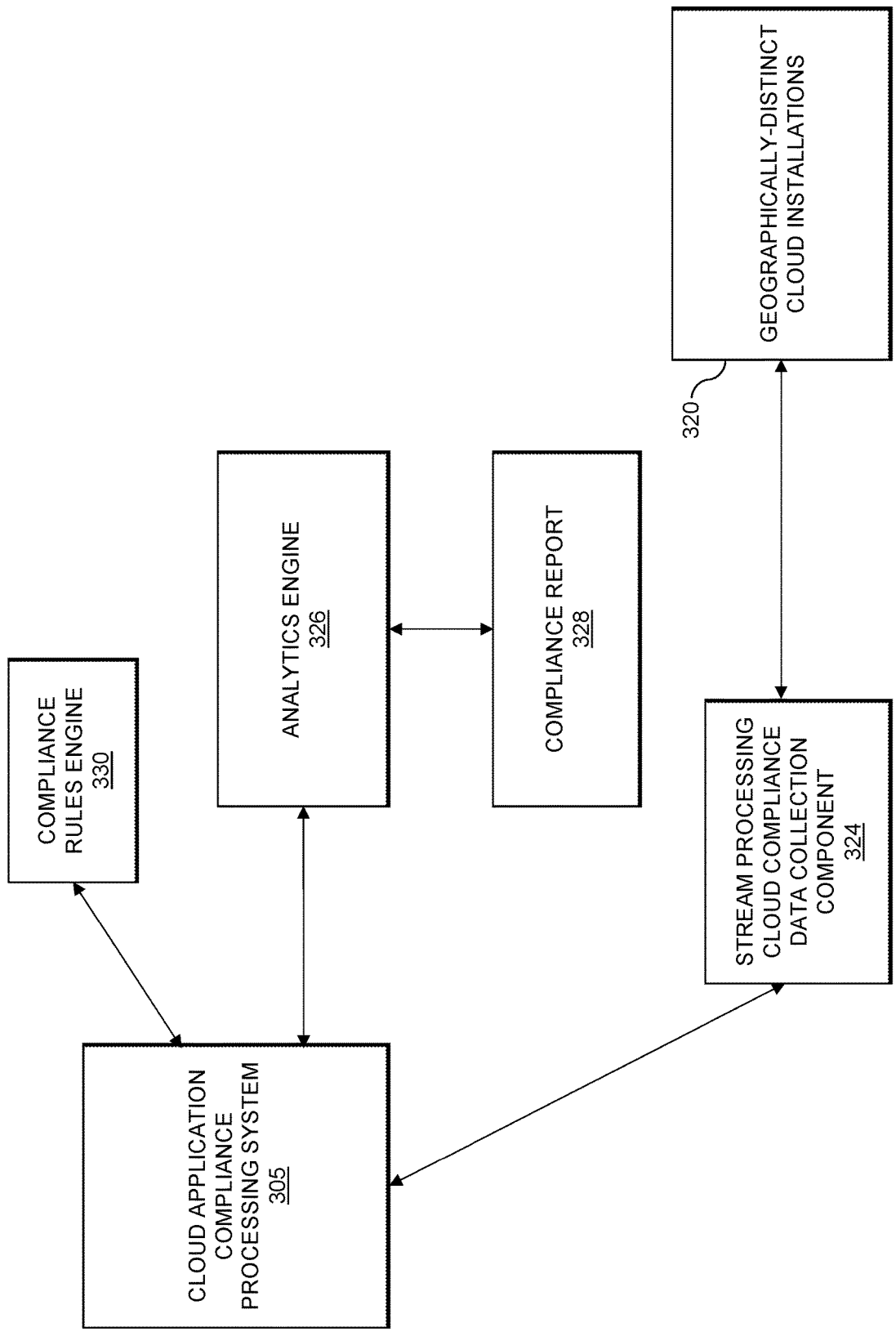
FIG. 3 shows an example workflow for automated compliance processing of cloud applications in an illustrative embodiment.

FIG. 3 shows an example workflow for automated compliance processing of cloud applications in an illustrative embodiment. By way of illustration, FIG. 3 depicts multiple geographically-distinct cloud installations 320 (e.g., cloud installations in Austin, Durham, Las Vegas, Atlanta, Limerick, etc.), which provide data to stream processing cloud compliance data collection component 324. Additionally, stream processing cloud compliance data collection component 324 provides at least a portion of the data collected to cloud application compliance processing system 305 for processing as detailed herein in connection with one or more embodiments. Also, in connection with such processing, cloud application compliance processing system 305 receives and utilizes rules from compliance rules engine 330.

By way merely of illustration, example rules that can be generated by compliance rules engine 330 might include the following: Assuming a predefined set of compliance stacks and buildpacks, if a microservice is using a stack or buildpack outside of this set, the microservice will be flagged as non-compliant; and for multi-datacenter compliance, a determination is made as to whether the microservice is deployed in more than one datacenter (having two different local traffic manager (LTM) routes) while having a global traffic manager (GTM) route in both datacenter cloud platforms.

Further, in the example embodiment depicted in FIG. 3, cloud application compliance processing system 305 outputs compliance-related data to analytics engine 326, which uses at least a portion of such data to generate and/or output at least one compliance report 328.

Accordingly, FIG. 2 illustrates an example embodiment pertaining to how compliance data are pulled and processed per cloud platform, and FIG. 3 illustrates an example embodiment pertaining to an overall compliance system which can include multiple cloud platforms.

Figure 4:
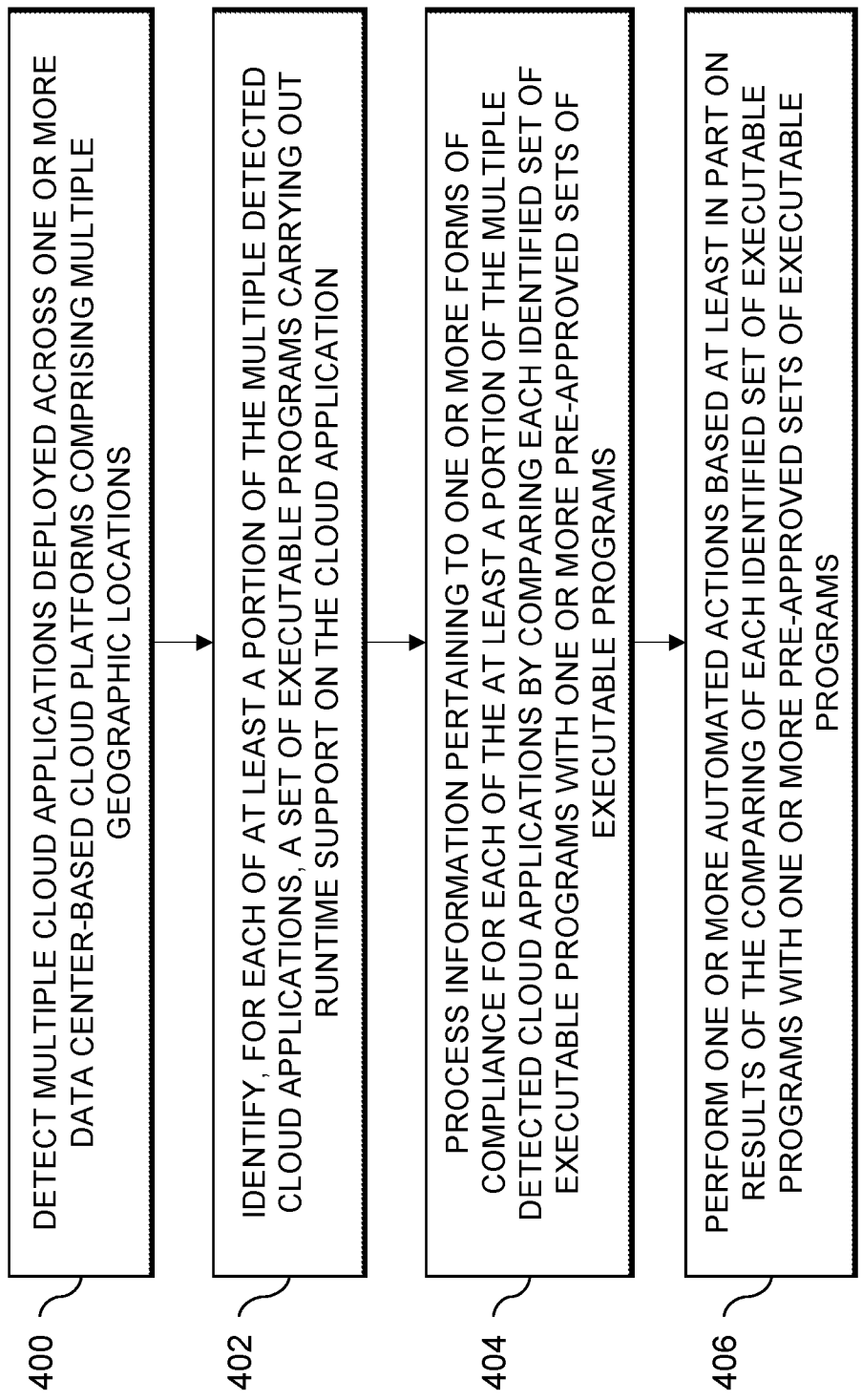
FIG. 4 is a flow diagram of a process for automated compliance processing for cloud applications in an illustrative embodiment.

FIG. 4 is a flow diagram of a process for automated compliance processing for cloud applications in an illustrative embodiment. It is to be understood that this particular process is only an example, and additional or alternative processes can be carried out in other embodiments.

In this embodiment, the process includes steps 400 through 406. These steps are assumed to be performed by the cloud application compliance processing system 105 utilizing its elements 112, 114 and 116.

Step 400 includes detecting multiple cloud applications deployed across one or more data center-based cloud platforms comprising multiple geographic locations. Step 402 includes identifying, for each of at least a portion of the multiple detected cloud applications, a set of executable programs (also referred to herein as buildpacks) carrying out runtime support on the cloud application.

Step 404 includes processing information pertaining to one or more forms of compliance (e.g., GTM-related compliance, multi-datacenter deployment-related compliance, security-related compliance, etc.) for each of the at least a portion of the multiple detected cloud applications by comparing each identified set of executable programs with one or more pre-approved sets of executable programs.

Step 406 includes performing one or more automated actions based at least in part on results of the comparing of each identified set of executable programs with one or more pre-approved sets of executable programs. In at least one embodiment, performing one or more automated actions includes generating at least one report based at least in part on the results. In such an embodiment, generating at least one report can include generating, using at least one user interface, at least one visualization illustrating at least a portion of the results. Additionally or alternatively, performing one or more automated actions can include initiating updating of at least a portion of the identified set of executable programs for one or more of the multiple detected cloud applications.

Also, in one or more embodiments, performing one or more automated actions can include storing, in at least one database, the results of the comparing of each identified set of executable programs with one or more pre-approved sets of executable programs. Such an embodiment can further include performing an additional iteration of detecting multiple cloud applications deployed across the one or more data center-based cloud platforms, performing an additional iteration of identifying, for each of the at least a portion of the multiple detected cloud applications, a set of executable programs carrying out runtime support on the cloud application, processing information pertaining to at least a portion of the one or more forms of compliance for each of the at least a portion of the multiple detected cloud applications by comparing each identified set of executable programs with at least a portion of the results stored in the at least one database, and performing one or more automated actions based at least in part on the processing.

The techniques depicted in FIG. 4 can also include annotating each of the at least a portion of the multiple detected cloud applications with information designating at least one group within an enterprise with which the cloud application is associated. In such an embodiment, performing one or more automated actions includes generating, for each respective group within the enterprise and using at least one user interface, a visualization illustrating a portion of the results corresponding to the group. Further, such an embodiment can include outputting each visualization to at least one user associated with the corresponding group within the enterprise, wherein the visualization can include an illustration of a percentage of the cloud applications associated with the at least one corresponding group exhibiting compliance with respect to the set of executable programs carrying out runtime support on each cloud application.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically process compliance parameters for cloud applications. These and other embodiments can effectively overcome problems associated with security vulnerabilities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
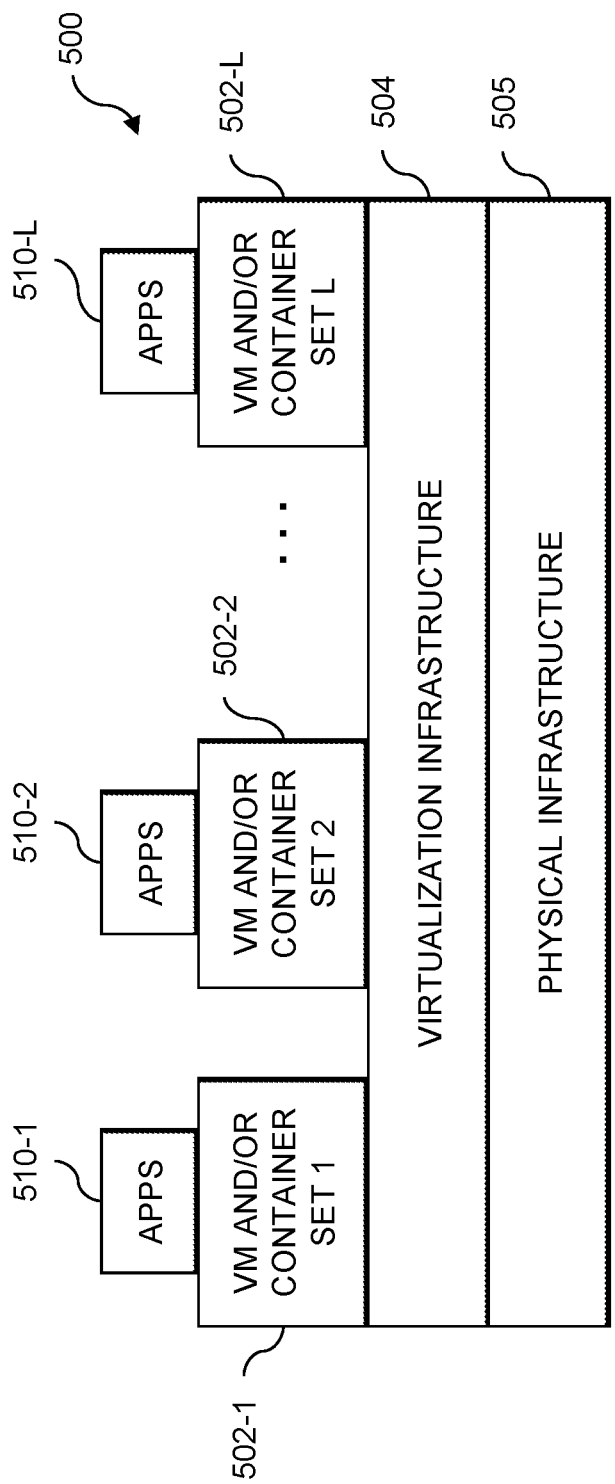
FIGS. 5 and 6 show examples of processing platforms that may be utilized to implement at least a portion of an information processing system in illustrative embodiments.
Figure 6:
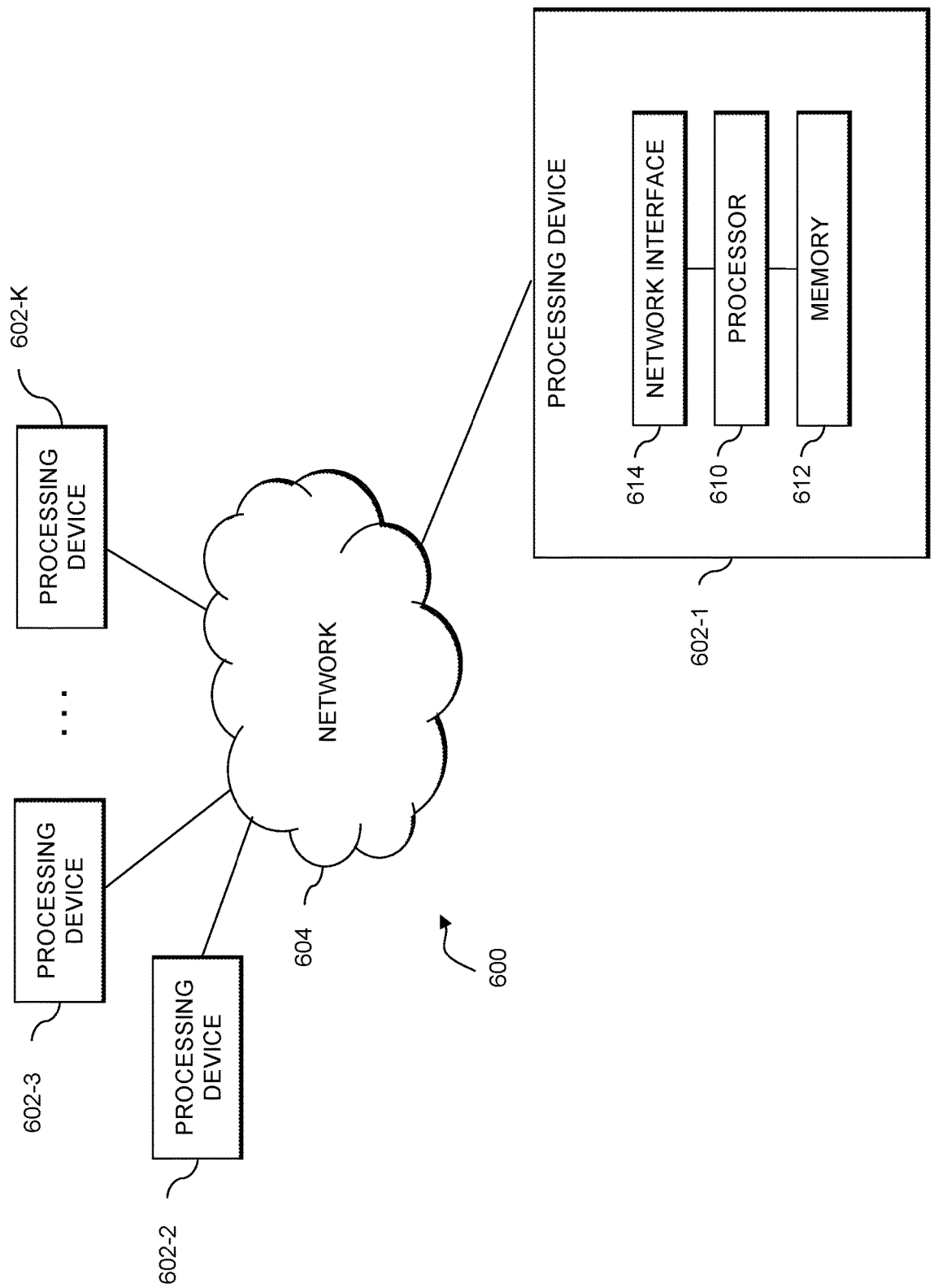

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . , 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    detecting multiple cloud applications deployed across multiple data center-based cloud platforms in respective multiple geographic locations;
    identifying, for each of at least a portion of the multiple detected cloud applications, a set of executable programs carrying out runtime support on the cloud application;
    configuring metadata of each of the at least a portion of the multiple detected cloud applications to include information identifying at least one user, associated with an enterprise with which the cloud application is also associated, the at least one user comprising at least one user designated for management of the at least a portion of the multiple detected cloud applications;
    processing information pertaining to one or more forms of compliance for each of the at least a portion of the multiple detected cloud applications by comparing each identified set of executable programs with one or more pre-approved sets of executable programs, wherein processing information pertaining to one or more forms of compliance comprises determining availability status of the at least a portion of the multiple detected cloud applications based on deployment in at least a designated number of data centers, wherein the designated number is greater than one; and
    performing one or more automated actions based at least in part on results of the comparing of each identified set of executable programs with one or more pre-approved sets of executable programs, wherein performing one or more automated actions comprises:

generating and outputting, to each of a plurality of respective identified users associated with the enterprise, at least one visualization illustrating at least a portion of the results corresponding to the identified user, wherein the at least one visualization includes:
  (i) one or more visual elements indicative of an amount of the cloud applications designated for management by the identified user exhibiting compliance with respect to a corresponding portion of the set of executable programs carrying out runtime support on the cloud applications designated for management by the identified user,
  (ii) a respective tag attributed to each of one or more of the cloud applications designated for management by the identified user illustrating the cloud application as being associated with one or more particular sub-systems within the enterprise, and
  (iii) identification of support-related content to be used in remedying one or more compliance issues with the cloud applications designated for management by the identified user; and
storing, in at least one database, the results of the comparing of each identified set of executable programs with one or more pre-approved sets of executable programs;
wherein the method is performed by at least one processing device comprising a processor coupled to a memory.

2. The computer-implemented method of claim 1, wherein generating cloud application compliance information comprises generating, using at least one user interface, at least one visualization illustrating at least a portion of the results.

3. The computer-implemented method of claim 1, wherein performing one or more automated actions comprises initiating updating of at least a portion of the identified set of executable programs for one or more of the multiple detected cloud applications.

4. The computer-implemented method of claim 1, further comprising:
  performing an additional iteration of detecting multiple cloud applications deployed across the multiple data center-based cloud platforms;
  performing an additional iteration of identifying, for each of the at least a portion of the multiple detected cloud applications, a set of executable programs carrying out runtime support on the cloud application;
  processing information pertaining to at least a portion of the one or more forms of compliance for each of the at least a portion of the multiple detected cloud applications by comparing each identified set of executable programs associated with the additional iteration of identifying with at least a portion of the results stored in the at least one database; and
  performing one or more additional automated actions based at least in part on the comparing of each identified set of executable programs associated with the additional iteration of identifying with the at least a portion of the results stored in the at least one database.

5. The computer-implemented method of claim 1, further comprising:
  outputting each visualization to at least one user associated with the corresponding identified user associated with the enterprise.

6. A non-transitory processor-readable storage medium having stored therein program code of one or more software programs, wherein the program code when executed by at least one processing device causes the at least one processing device:
  to detect multiple cloud applications deployed across multiple data center-based cloud platforms in respective multiple geographic locations;
  to identify, for each of at least a portion of the multiple detected cloud applications, a set of executable programs carrying out runtime support on the cloud application;
  to configure metadata of each of the at least a portion of the multiple detected cloud applications to include information identifying at least one user, associated with an enterprise with which the cloud application is also associated, the at least one user comprising at least one user designated for management of the at least a portion of the multiple detected cloud applications;
  to process information pertaining to one or more forms of compliance for each of the at least a portion of the multiple detected cloud applications by comparing each identified set of executable programs with one or more pre-approved sets of executable programs, wherein processing information pertaining to one or more forms of compliance comprises determining availability status of the at least a portion of the multiple detected cloud applications based on deployment in at least a designated number of data centers, wherein the designated number is greater than one; and
  to perform one or more automated actions based at least in part on results of the comparing of each identified set of executable programs with one or more pre-approved sets of executable programs, wherein performing one or more automated actions comprises:
    generating and outputting, to each of a plurality of respective identified users associated with the enterprise, at least one visualization illustrating at least a portion of the results corresponding to the identified user, wherein the at least one visualization includes:
      (i) one or more visual elements indicative of an amount of the cloud applications designated for management by the identified user exhibiting compliance with respect to a corresponding portion of the set of executable programs carrying out runtime support on the cloud applications designated for management by the identified user,
      (ii) a respective tag attributed to each of one or more of the cloud applications designated for management by the identified user illustrating the cloud application as being associated with one or more particular sub-systems within the enterprise, and
      (iii) identification of support-related content to be used in remedying one or more compliance issues with the cloud applications designated for management by the identified user; and
    storing, in at least one database, the results of the comparing of each identified set of executable programs with one or more pre-approved sets of executable programs.

7. The non-transitory processor-readable storage medium of claim 6, wherein generating cloud application compliance information comprises generating, using at least one user interface, at least one visualization illustrating at least a portion of the results.

8. The non-transitory processor-readable storage medium of claim 6, wherein performing one or more automated actions comprises initiating updating of at least a portion of the identified set of executable programs for one or more of the multiple detected cloud applications.

9. An apparatus comprising:
at least one processing device comprising a processor coupled to a memory;
the at least one processing device being configured:
to detect multiple cloud applications deployed across multiple data center-based cloud platforms in respective multiple geographic locations;
to identify, for each of at least a portion of the multiple detected cloud applications, a set of executable programs carrying out runtime support on the cloud application;
to configure metadata of each of the at least a portion of the multiple detected cloud applications to include information identifying at least one user, associated with an enterprise with which the cloud application is also associated, the at least one user comprising at least one user designated for management of the at least a portion of the multiple detected cloud applications;
to process information pertaining to one or more forms of compliance for each of the at least a portion of the multiple detected cloud applications by comparing each identified set of executable programs with one or more pre-approved sets of executable programs, wherein processing information pertaining to one or more forms of compliance comprises determining availability status of the at least a portion of the multiple detected cloud applications based on deployment in at least a designated number of data centers, wherein the designated number is greater than one; and
to perform one or more automated actions based at least in part on results of the comparing of each identified set of executable programs with one or more pre-approved sets of executable programs, wherein performing one or more automated actions comprises:
generating and outputting, to each of a plurality of respective identified users associated with the enterprise, at least one visualization illustrating at least a portion of the results corresponding to the identified user, wherein the at least one visualization includes:
(i) one or more visual elements indicative of an amount of the cloud applications designated for management by the identified user exhibiting compliance with respect to a corresponding portion of the set of executable programs carrying out runtime support on the cloud applications designated for management by the identified user,
(ii) a respective tag attributed to each of one or more of the cloud applications designated for management by the identified user illustrating the cloud application as being associated with one or more particular sub-systems within the enterprise, and
(iii) identification of support-related content to be used in remedying one or more compliance issues with the cloud applications designated for management by the identified user; and
storing, in at least one database, the results of the comparing of each identified set of executable programs with one or more pre-approved sets of executable programs.

10. The apparatus of claim 9, wherein generating cloud application compliance information comprises generating, using at least one user interface, at least one visualization illustrating at least a portion of the results.

11. The apparatus of claim 9, wherein performing one or more automated actions comprises initiating updating of at least a portion of the identified set of executable programs for one or more of the multiple detected cloud applications.

12. The apparatus of claim 9, wherein the at least one processing device is further configured:
to perform an additional iteration of detecting multiple cloud applications deployed across the multiple data center-based cloud platforms;
to perform an additional iteration of identifying, for each of the at least a portion of the multiple detected cloud applications, a set of executable programs carrying out runtime support on the cloud application;
to process information pertaining to at least a portion of the one or more forms of compliance for each of the at least a portion of the multiple detected cloud applications by comparing each identified set of executable programs associated with the additional iteration of identifying with at least a portion of the results stored in the at least one database; and
to perform one or more additional automated actions based at least in part on the comparing of each identified set of executable programs associated with the additional iteration of identifying with the at least a portion of the results stored in the at least one database.

13. The apparatus of claim 9, wherein the at least one processing device is further configured:
to output each visualization to at least one user associated with the corresponding identified user associated with the enterprise.

14. The non-transitory processor-readable storage medium of claim 6, wherein the program code when executed by the at least one processing device causes the at least one processing device:
to perform an additional iteration of detecting multiple cloud applications deployed across the multiple data center-based cloud platforms;
to perform an additional iteration of identifying, for each of the at least a portion of the multiple detected cloud applications, a set of executable programs carrying out runtime support on the cloud application;
to process information pertaining to at least a portion of the one or more forms of compliance for each of the at least a portion of the multiple detected cloud applications by comparing each identified set of executable programs associated with the additional iteration of identifying with at least a portion of the results stored in the at least one database; and
to perform one or more additional automated actions based at least in part on the comparing of each identified set of executable programs associated with the additional iteration of identifying with the at least a portion of the results stored in the at least one database.

15. The non-transitory processor-readable storage medium of claim 6, wherein the program code when executed by the at least one processing device causes the at least one processing device:
to output each visualization to at least one user associated with the corresponding identified user associated with the enterprise.

16. The computer-implemented method of claim 1, wherein processing information pertaining to one or more forms of compliance for each of the at least a portion of the multiple detected cloud applications comprises processing the metadata of each of the at least a portion of the multiple detected cloud applications using a set of one or more designated compliance-related rules.

17. The apparatus of claim 9, wherein processing information pertaining to one or more forms of compliance for each of the at least a portion of the multiple detected cloud applications comprises processing the metadata of each of the at least a portion of the multiple detected cloud applications using a set of one or more designated compliance-related rules.

* * * * *